United States Patent [19]
Daniels

[11] 3,896,623
[45] July 29, 1975

[54] BOILER-TURBINE CONTROL SYSTEM
[75] Inventor: James H. Daniels, North Wales, Pa.
[73] Assignee: Leeds & Northrup Company, North Wales, Pa.
[22] Filed: Mar. 6, 1974
[21] Appl. No.: 448,602

[52] U.S. Cl. ............................................. 60/665
[51] Int. Cl. .......................................... F01k 13/02
[58] Field of Search ........................... 60/660–667; 415/17

[56] References Cited
UNITED STATES PATENTS
3,545,207  12/1970  Barber et al. .................... 60/664 X
3,802,189  4/1974   Jenkins, Jr. ...................... 60/665 X Primary Examiner—Martin P. Schwadron
Assistant Examiner—Allen M. Ostrager
Attorney, Agent, or Firm—William G. Miller, Jr.; Raymond F. MacKay

[57] ABSTRACT

A system for providing a demand signal to control the boiler inputs in a boiler-turbine combination operating in a sliding pressure mode with the generation being controlled to a desired value. The demand signal for the boiler inputs is obtained by multiplying the ratio of first stage turbine pressure to throttle pressure by the throttle pressure set point and the throttle pressure set point is controlled so as to maintain the first stage temperature at a preset desired value. The demand signal is modified to trim the boiler inputs to maintain the throttle pressure at its set point.

9 Claims, 4 Drawing Figures

BOILER-TURBINE CONTROL SYSTEM

BACKGROUND OF THE INVENTION

The conventional method of regulating central station generating units, is to vary the steam flow and, therefore, the generation by changing the steam input area. This is accomplished by positioning a set of turbine input valves, which may operate in sequence or in parallel depending upon the indivdual turbine design. Steam pressure in maintained constant and the flow is a function of valve position.

Sliding pressure is an alternate method of regulating a generating unit, in which the inlet valve position is either fixed or allowed to vary as required to maintain the generation and other set conditions. Steam flow and generation are varied by changing throttle pressure. Increasing pressure increases generation and conversely decreasing pressure decreases generation. Usually, the turbine valves are utilized to give an immediate transient response to generation demand with the final requirement provided by changing through automatic control of boiler inputs the operating or throttle pressure to meet a particular requirement. Thus, the turbine control valves tend to remain in a position as the generation varies over its load range, determined by the throttle pressure control requirement.

One of the advantages of sliding pressure control is the reduction of thermal stresses in the turbine when compared with the conventional control which maintained a fixed throttle pressure as the load changed.

This invention relates to a boiler-turbine control system using the sliding pressure approach while minimizing as much as possible thermal stresses in the turbine. More particularly, this invention relates to a control system for controlling the throttle pressure in a boiler-turbine system so as to maintain a predetermined value for the temperature of the first stage of the turbine.

The first stage temperature may be the temperature of the steam in the first stage or impulse chamber, as it is sometimes referred to, or the first stage temperature may be represented by the temperature of the metal in the first stage. When the measurement of temperature in the first stage is not available the high pressure turbine exhaust temperature or a high pressure turbine extraction steam temperature may be used. Therefore, for the purposes of this specification and the appended claims the term "first stage temperature" is intended to include the above mentioned temperatures and similar temperature measurements which have a relationship generally proportional to the first stage steam temperature itself.

Past systems have programmed the throttle pressure set point to tend to maintain the turbine control valve at a particular desired opening. That approach tended to minimize the thermal stresses; however, the present invention provides an improved system for programming the throttle pressure set point to obtain less thermal stress than obtained from using the previous systems.

Accordingly, it is an object of this invention to provide an improved method and means for controlling the boiler inputs in a boiler-turbine system in which the throttle pressure is allowed to operate over a limited range in a sliding pressure mode.

SUMMARY OF THE INVENTION

In accordance with this invention there is provided a boiler-turbine control system for operating in a sliding pressure mode with the throttle pressure being automatically controlled to a desired value with the control system being operable to modify the throttle pressure set point to reduce the deviation between a desired value for the first stage temperature and the measured value of the first stage temperature.

DESCRIPTION OF THE PREFERRED EMBODIMENT

Figure 1:
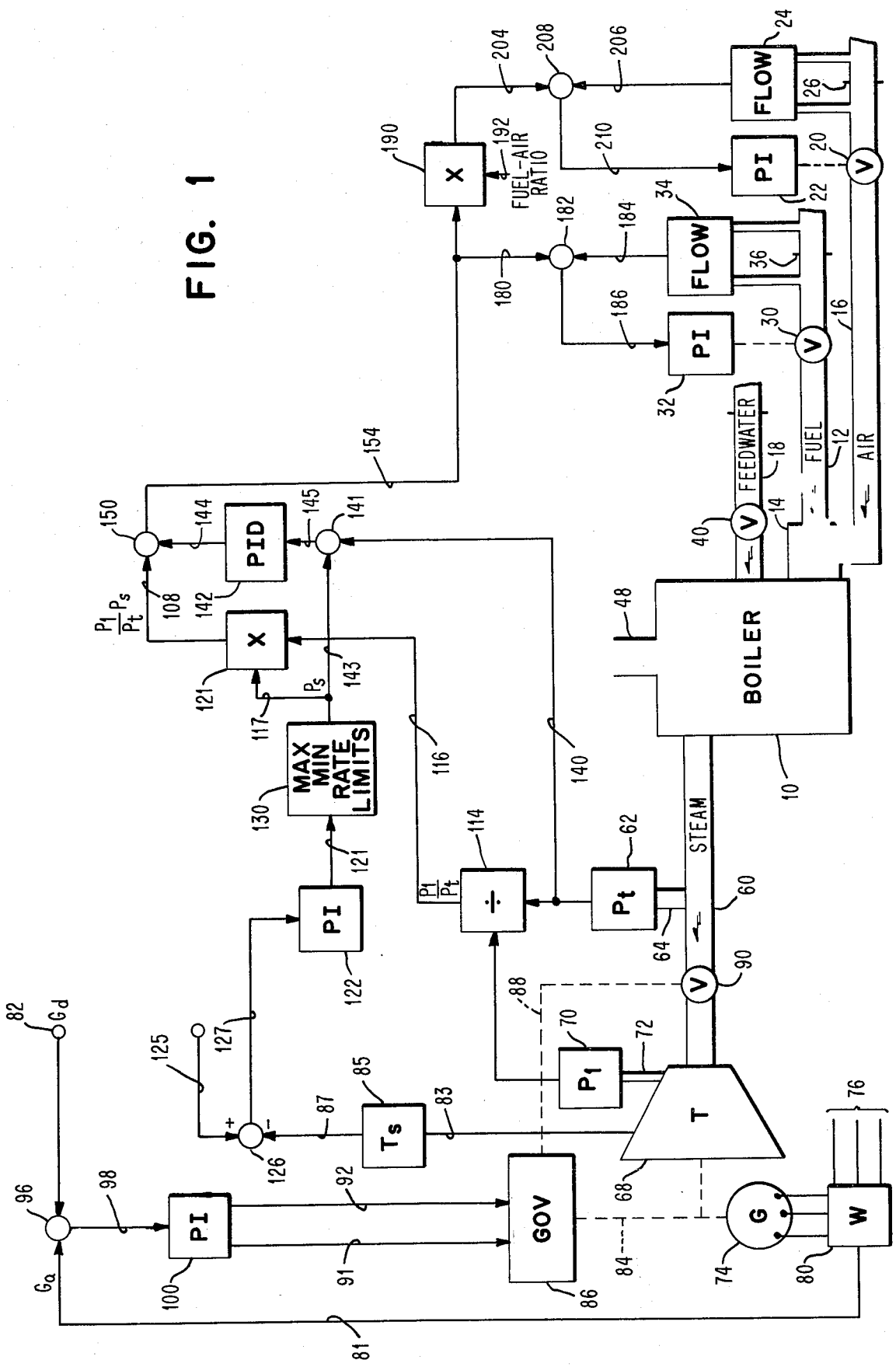
FIG. 1 is a block diagram of one form of a boiler control system for carrying out the present invention.

In FIG. 1 the boiler 10 is provided with the usual inputs such as fuel flow through line 12 and air flow through line 16. The fuel flow and air flow are combined at the burner 14 so as to provide a necessary heat input to the boiler. The feedwater flow is provided through line 18. The air flow input through line 16 is subject to control by the adjustment of valve 20 by controller 22 which is shown as a controller providing both proportional and integral action as noted by the block labeled PI. The air flow through line 16 is measured by the flowmeter 24, which by means of the associated pressure taps responds to the pressure differential established across the flow restriction 26.

Similarly, the fuel flow in line 12 is subject to control by the adjustment of valve 30 by controller 32 which is similar to controller 22. Also, the fuel flow is measured by flowmeter 34 in accordance with the pressure drop across the orifice plate 36.

The feedwater flow through line 18 is subject to control by valve 40 in response to the action of a controller (not shown) which can operate to control the feedwater in any one of a number of ways known in the art.

The steam pressure $P_t$ produced by the boiler in the output steam line 60, referred to as the throttle pressure, is measured by the pressure measuring device 62 through the tap 64 connected to the output steam line 60.

Another measurement which is necessary for the control system shown in FIG. 1 is a measurement representative of the steam flow to the turbine. That measurement may be a direct measurement of steam flow or may be made by measurement of the pressure in the first stage of the turbine or another appropriate stage, which measurement is related to the flow of steam through the turbine. Thus, in FIG. 1, the first stage pressure $P_1$ of the turbine is measured by the pressure measuring device 70 which is connected by tap 72 to the first stage of turbine 68.

A temperature measurement of the steam in the first stage is also made. This measurement may be made by a thermocouple which would normally be connected, as by leadwire 83, to a transmitter 85 which will produce on line 87 a signal representative of the first stage temperature.

As shown in FIG. 1, steam from the boiler 10 is supplied through a turbine control valve 90 to turbine 68.

The valve 90 represents the set of valves normally used. The turbine 68 is mechanically coupled to the generator 74 to produce an electrical output on lines 76. The power output on lines 76 is shown as being measured by a wattmeter 80 to provide on line 81 a signal representative of the actual output $G_a$ of the generator G.

For the purpose of establishing the desired output of the generator 74, there is provided at terminal 82, a signal $G_d$ representing the desired generation for generator 74.

The governor mechanism represented by block 86 is mechanically coupled to the turbine-generator by coupling 84. The mechanical outputs of the governor 86 through coupling 88 controls the position of the turbine control valve 90 which in turn controls the steam flow to the turbine 68. Governor 86 is controlled by signals on lines 91 and 92 to cause the governor to increase or decrease the opening of valve 90 to change steam flow as required to maintain generation measured by a $G_a$ on line 81 at its desired value $G_d$ through the controller 100.

As shown in FIG. 1, provision is made to supply governor control signals on lines 91 and 92 in response to comparison of the signals $G_d$ and $G_a$ in the comparator 96. The difference between those two signals then appears on line 98 as an input to the controller 100. The controller 100 has both proportional and integral response. That particular controller may be of the type disclosed in U.S. Pat. No. 3,008,072 and may be designed so as to produce on its output lines 91 and 92 electrical pulse signals whose duration depends upon the extent of the incremental control action called for by the controller 100.

Having described the manner in which the electrical output of the generator 74 is controlled in response to the signal supplied to terminal 82, there will now be described the manner in which the energy input to the boiler 10 is controlled so as to provide the desired steam pressure $P_s$. As will be explained subsequently, the signal $P_s$ is subject to modification by a control system so as to maintain a desired temperature in the first stage of the turbine.

The signal provided on line 108 is representative of the power demand established for the turbine 68. That turbine power demand signal is established by dividing the measured first stage pressure ($P_1$) in the turbine 68 by the measured throttle pressure $P_t$ as in the dividing network shown as block 114. There is thus obtained at line 116 a signal representative of the quantity $P_1/P_t$. That quantity is then multiplied in multiplier 121 by signal $P_s$ on line 117, which signal is representative of the throttle pressure set point.

The signal on line 117 is established, as shown, by a control system. In FIG. 1 the control system for establishing the signal on line 117 includes a source providing on line 125 a preset signal representing the desired value for the first stage temperature. The desired value as represented by the signal on line 125 is compared by comparator 126 with the signal representing the measured value of the first stage temperature appearing on line 87. An error signal then appears on line 127 out of the comparator 126 which represents the deviation of the first stage temperature from its desired value. It is that deviation which it is desired to reduce to zero by means of the controller 122, which is shown as being a controller having both proportional and integral action. Thus, it is primarily the object of the control system for producing the signal on line 117 to respond to a deviation between the signal on line 125 and the signal on line 87 so as to maintain those signals as nearly equal as possible by control action of controller 122 adjusting the signal $P_s$ on line 117, which through the boiler input control system produces a change in the steam pressure in line 60 so that the temperature $T_s$ in the first stage changes accordingly, that is, toward its desired value.

The output of the controller 122 on line 121 then provides an input to the limit circuits shown as block 130. Those limit circuits will include means for limiting the output, namely, the signal $P_s$ representative of the pressure set point, on line 117, to a maximum and minimum value as well as limiting the rate at which that value changes.

The signal $P_s$ thus tends to vary as a result of the operation of controller 122 within a limited range and at a limited rate so as to attempt to maintain an equality between the desired first stage temperature as established by the set point signal on line 125.

The boiler demand signal on line 108 is subject to modification in accordance with the deviation of the throttle pressure $P_t$ from its desired value, set point $P_s$. This modification is accomplished by utilizing the output signal of the pressure measuring device 62 which is supplied on line 140 as an input to a comparator 141 which has as its other input the signal $P_s$ shown as being supplied on line 143. The results of the comparison in the comparator 141 is a signal on line 145 representative of the deviation of the throttle pressure $P_t$ from its set point $P_s$. the signal on line 145 is an input to the controller 142. The controller 142 has proportional, integral and derivative action so as to provide an output on line 144 which is added to the signal on line 108 by the summing unit 150 so as to provide an output on line 154 which is a modified demand signal representative of the required boiler inputs. As shown in FIG. 1, the signal on line 154 is used for controlling the energy input to the boiler 10.

The signal on line 154 is representative of the fuel flow to the boiler 10 needed to maintain the desired pressure in the steam line 60. The signal on line 154 is introduced by way of line 180 to the comparator 182 where it is compared with the actual fuel flow signal on line 184 as derived from flowmeter 34. The result of the comparison provides an error signal on line 186 which serves as an input to controller 32 so that the controller is effective to adjust the position of valve 30 to maintain the fuel flow in line 12 at a value corresponding with the fuel requirement established by the signal on line 180.

The desired relationship between the fuel flow and the air flow is normally controlled in response to the desired fuel-air ratio signal introduced on line 192 to a multiplier 190.

The output from 190 on line 204 is a signal representative of the required air flow through line 16 needed to maintain the desired air-fuel ratio when the fuel flow in line 12 is in accordance with the signal on line 180.

The signal on line 204 is compared with the signal on line 206 as derived from the flowmeter 24 representing the measure of the air flow in line 16. The signal on line 206 is compared with the signal on line 204 by the comparator 208 and provides an output on line 210 which represents an error signal input to controller 22 so that the controller can adjust the valve 20 to modify the air flow in line 16 so as to maintain as closely as possible the air flow corresponding to the signal on line 204.

The first stage temperature in turbine 68, when the system is in a quiescent state, will normally be at a value corresponding to that represented by the signal on line 125. If, for example, a change in $G_d$ should then occur, the controller 100 would cause a resetting of the governor 86 which would in turn change the opening in valve 90 in a direction to change the steam flow to the turbine 68 so as to change the output $G_a$ of the generator so that it will equal the new value $G_d$. The change in the opening of valve 90 will cause a change in the ratio $P_1/P_t$ and consequently a similar change in the demand signal $P_1P_s/P_t$ on line 108 resulting in immediate changes in boiler inputs. Thus, while the load control system operates on the governor 86 to cause changes in generation by modifying the valve 90 and hence the first stage temperature, the controller 122 serves to cause a change in the steam output of the boiler by changing its operating pressure $P_s$. The change in operating pressure will tend to cause a change in generation which will reposition valve 90 through operation of controller 100. This action will return first stage temperature to its desired value.

Figure 2:
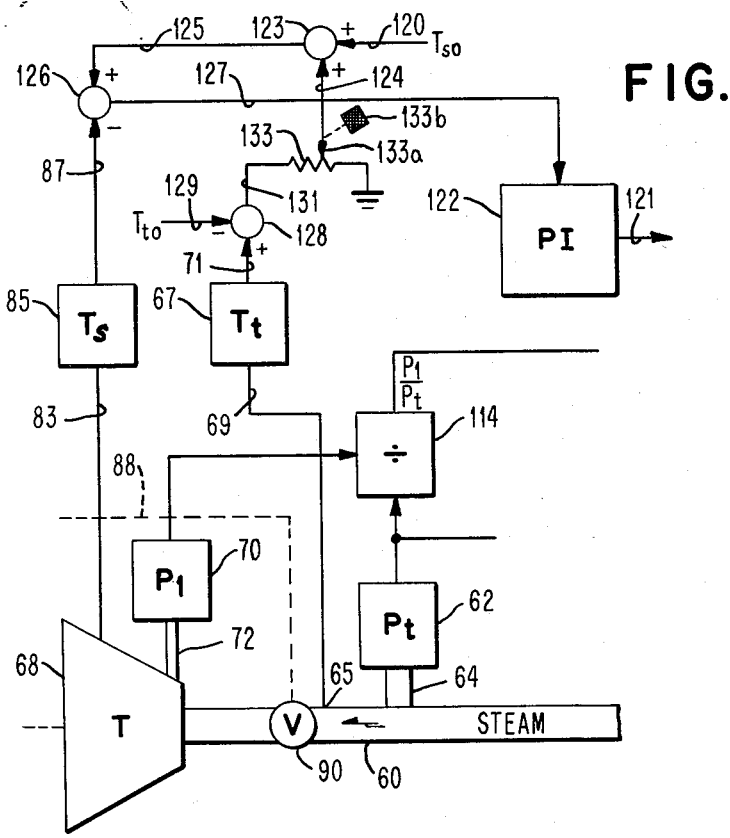
FIG. 2 is a block diagram showing a modified form of the system of FIG. 1.

In order that the desired value for the first stage temperature may be kept within a reasonable range of values when throttle temperature varies over a wide range, the arrangement of FIG. 2 can be used. In FIG. 2 the signal on line 124 is provided to modify through comparator 123 the set point value $T_{so}$ represented by the signal on line 120 to produce the desired value or effective set point signal on line 125. To produce the signal on line 124 the throttle temperature $T_t$ is compared to a set point value $T_{to}$. The throttle temperature is measured in the steam line 60 at point 65, as by a thermocouple, to provide an imput to transmitter 67 by way of leadwire 69. Transmitter 67 then produces on line 71 a signal representative of the throttle temperature $T_t$. Thus, the signal on line 71 is compared in comparator 128 to the signal on line 129 which is generated to be representative of $T_{to}$, the desired value $T_t$. The comparator 128 then provides an output signal on line 131 representing the deviation of $T_t$ from $T_{to}$. The signal on line 131 provides a potential drop across potentiometer 133 representative of $T_t - T_{to}$ so that the adjustable tap 133a provides the desired potential on line 124 to compensate the signal on line 120 as desired. The setting of tap 133a will be determined empirically with the adjustment being made by knob 133b.

Figure 3:
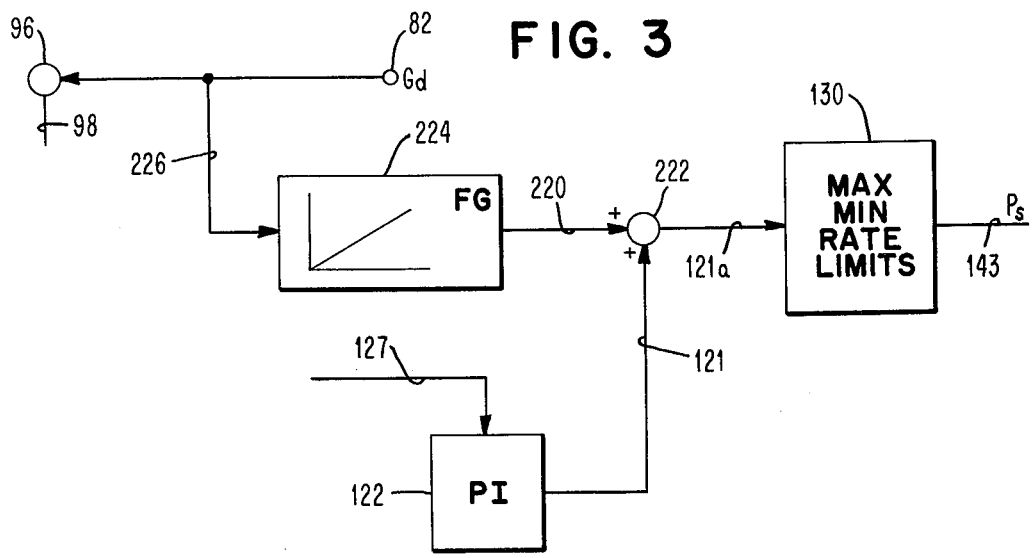
FIG. 3 is a block diagram showing the changes necessary to provide one modified form of the system of FIG. 1.

In the present FIG. 3 there is disclosed an arrangement which utilizes a programmed throttle pressure set point as previously mentioned in reference to the prior art. In FIG. 3, however, this set point is biased in a novel manner by the output of controller 122. The output of the controller 122 on line 121 provides a signal which is added to the signal on line 220 by comparator 222 to produce an input signal to the limit circuit 130 on line 121a which produces the throttle pressure set point, $P_s$. The signal which is added by way of line 220 is the programmed set point and is developed by a function generator 224 whose input from line 226 is obtained from the signal $G_d$ indicative of the desired generation available at terminal 82. This arrangement corrects the programmed pressure set point as required to bring first stage temperature to its desired value in the manner previously described.

Figure 4:
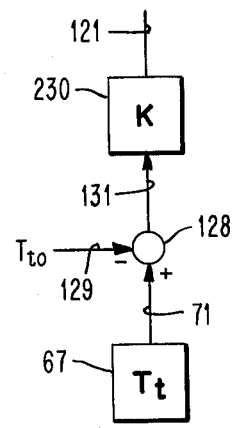
FIG. 4 is a block diagram showing a modified form of the system of FIG. 3.

In FIG. 4 there is shown a variation in the arrangement of FIG. 3 wherein there is substituted for the controller 122 and its input from line 127 a signal for line 121 which is related to the deviation of the throttle temperature as produced from transmitter 67 on line 71 and the throttle temperature set point $T_o$ as produced on line 129. The difference between the throttle temperature $T_t$ and the set point $T_o$ is obtained as an output from the comparator 128 on line 131. The signal on line 131 is multiplied by a constant K which serves as a scaling factor. That multiplication is carried out in block 230 to provide on line 121 a signal which is indicative of the deviation of the first stage temperature of the turbine from its desired value resulting from a throttle temperature deviation from the value, $T_{to}$, anticipated in the development of the programmed pressure set point generated in function generator 224.

What is claimed is:

1. Apparatus for controlling the inputs to a boiler of a boiler-turbine system in response to a demand signal calculated as the product of a signal representing a setpoint for the pressure of steam supplied by the boiler and a signal representing the ratio of a signal representing the steam flow in the turbine to a signal representing the measured value of said pressure with means for modifying said demand signal until said measured pressure returns to said setpoint and with a control valve for controlling the steam flow to the turbine so as to maintain a desired power output from a generator unit driven by said turbine, wherein the improvement comprises;

means for measuring the temperature in the first stage of the turbine, means for establishing a desired value for said first stage temperature, and means operable to modify said pressure setpoint until the measured first stage temperature corresponds to the desired value for the first stage temperature.

2. Apparatus for controlling the inputs to a boiler of a boiler-turbine system in response to a demand signal calculated as the product of a signal representing a setpoint for the pressure of steam supplied by the boiler and a signal representing the ratio of a signal representing the steam flow in the turbine to a signal representing the measured value of said pressure with means for modifying said setpoint and with a control valve for controlling the steam flow to the turbine so as to maintain a desired power output from a generator unit driven by said turbine, wherein the improvement comprises;

means for producing a first signal representative of the desired temperature in the first stage of the turbine, means for producing a second signal representative of the measured value of said first stage temperature, means for comparing said first and second signals, and means for controlling the pressure setpoint in direction to an extent which tends to maintain equality between said first and second signals.

3. Apparatus as set forth in claim 2 in which the means for controlling the pressure setpoint includes a proportional and integral function in response to the deviation between the first and second signals.

4. Apparatus as set forth in claim 2 in which the improvement includes means for producing a signal representative of the deviation between the throttle temperature and the desired value for said throttle temperature and means for modifying the deviation between said first and second signals in accordance with the deviation between the throttle temperature and the desired value for said throttle temperature.

5. Apparatus as set forth in claim 4 in which said signal which is representative of the deviation between the throttle temperature and the desired value for said throttle temperatures is modified to be a predetermined fraction of that deviation.

6. Apparatus for controlling the inputs to a boiler of a boiler-turbine system in response to a demand signal calculated as the product of a signal representing a setpoint for the pressure of steam supplied by the boiler and a signal representing the ratio of a signal representing the steam flow in the turbine to a signal representing the measured value of said pressure with means for modifying said demand signal until said measured pressure returns to said setpoint and with a control valve for controlling the steam flow to the turbine so as to maintain a desired power output from a generator unit driven by said turbine, wherein the improvement comprises;

means for measuring turbine first stage temperature,
means for establishing a desired value for said first stage temperature,
means for measuring the throttle temperature,
means for establishing a setpoint for said throttle temperature,
means for establishing a modifying signal representing a fraction of the deviation of said throttle temperature from said throttle temperature setpoint,
means for modifying said desired value for the first stage temperature in accordance with said modifying signal, and
means operable to modify said pressure setpoint until the measured first stage temperature corresponds to the modified value of said desired value for the first stage temperature.

7. Apparatus for controlling the inputs to a boiler of a boiler-turbine system in response to a demand signal calculated as the product of a signal representing a setpoint for the pressure of steam supplied by the boiler and a signal representing the ratio of a signal representing the steam flow in the turbine to a signal representing the measured value of said pressure with means for modifying said demand signal until said measured pressure returns to said setpoint and with a control valve for controlling the steam flow to the turbine so as to maintain a desired power output from a generator unit driven by said turbine, wherein the improvement comprises;

means for programming the value of the pressure setpoint as a predetermined function of the desired output of the generator driven by the turbine,
means for measuring the temperature in the first stage of said turbine,
means for establishing a desired value for said first stage temperature, and
means operable to bias said programmed setpoint until said measured first stage temperature corresponds to the desired value.

8. Apparatus for controlling the inputs to a boiler of a boiler-turbine system in response to a demand signal calculated as the product of a signal representing a setpoint for the pressure of steam supplied by the boiler and a signal representing the ratio of a signal representing the steam flow in the turbine to a signal representing the measured value of said pressure with means for modifying said demand signal until said measured pressure returns to said setpoint and with a control valve for controlling the steam flow to the turbine so as to maintain a desired power output from a generator unit driven by said turbine, wherein the improvement comprises;

means for programming the value of the pressure setpoint as a predetermined function of the desired output of the generator driven by said turbine,
means for measuring the throttle temperature,
means for establishing a desired value for said throttle temperature in accordance with that value anticipated in relation to said predetermined function, and
means operable to bias said programmed setpoint in accordance with the deviation between said desired and measured values for said throttle temperature.

9. The method for automatically controlling inputs to a boiler-turbine system so as to tend to maintain the first stage temperature of the turbine at a desired value when a throttle valve controlling steam flow to the turbine is subject to control to maintain a desired power output from a generator driven by said turbine comprising the steps of:

producing a signal representing the steam flow to the turbine,
producing a signal representing the measured throttle pressure at the boiler output,
producing a signal representing the throttle pressure set point,
producing a demand signal in accordance with the ratio of said signal representing steam flow to the turbine with respect to said signal representing the measured throttle pressure at the boiler output all multiplied by said signal representing throttle pressure set point,
producing a signal representative of the deviation of the measured value of the first stage temperature from the desired value of said first stage temperature,
modifying the signal representative of said throttle pressure set point so as to tend to reduce the deviation between said measured and desired values of said first stage temperature,
modifying the demand signal so as to tend to maintain the said throttle pressure at its modified set point, and
controlling the boiler inputs in accordance with said modified demand signal.

* * * * *